US009444564B2

United States Patent
Sun et al.

(10) Patent No.: US 9,444,564 B2
(45) Date of Patent: Sep. 13, 2016

(54) SELECTIVELY DIRECTING MEDIA FEEDS TO A SET OF TARGET USER EQUIPMENTS

(75) Inventors: Samuel K. Sun, San Diego, CA (US); Anthony Pierre Stonefield, San Diego, CA (US); Richard W. Lankford, San Diego, CA (US); Mark A. Lindner, Superior, CO (US); Shane R. Dewing, San Diego, CA (US); Daniel S. Abplanalp, Salem, OR (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/468,921

(22) Filed: May 10, 2012

(65) Prior Publication Data

US 2013/0301624 A1  Nov. 14, 2013

(51) Int. Cl.
| | |
|---|---|
| *H04H 20/72* | (2008.01) |
| *H04W 4/06* | (2009.01) |
| *H04W 4/00* | (2009.01) |
| *H04W 4/08* | (2009.01) |

(52) U.S. Cl.
CPC .............. *H04H 20/72* (2013.01); *H04W 4/06* (2013.01); *H04W 4/008* (2013.01); *H04W 4/08* (2013.01)

(58) Field of Classification Search
CPC . H04W 4/008; H04W 4/0065; H04W 72/01; H04W 76/08; H04W 72/005; H04W 76/002; H04W 84/18; H04W 84/20; H04W 88/04; H04N 1/000116; H04N 1/000124
USPC ..................... 370/310, 310.2, 328, 338, 350; 348/154, 157, 159, 207.11
See application file for complete search history.

(56) References Cited

U.S. PATENT DOCUMENTS

| | | | |
|---|---|---|---|
| 7,039,672 B2 | 5/2006 | Wu et al. | |
| 7,536,705 B1 | 5/2009 | Boucher et al. | |
| 7,664,861 B2 | 2/2010 | Guntupalli et al. | |
| 7,966,636 B2 * | 6/2011 | Arseneau | 725/100 |

(Continued)

FOREIGN PATENT DOCUMENTS

| | | |
|---|---|---|
| CN | 1947452 A | 4/2007 |
| CN | 101199220 A | 6/2008 |

(Continued)

OTHER PUBLICATIONS

International Search Report and Written Opinion—PCT/US2013/039414—ISA/EPO—Aug. 13, 2013.

(Continued)

*Primary Examiner* — Mohamed Kamara
(74) *Attorney, Agent, or Firm* — Kevin T. Cheatham

(57) ABSTRACT

In an embodiment, a given UE joins a local group communication session between a group of UEs, establishes itself as a director, obtains media feeds captured by media capturing UEs in the group of UEs and transmits a selected subset of the media feeds to a server for transmission to target UEs. In another embodiment, the server receives the media feeds itself and sends the media feeds to a director UE. The director UE indicates a selection of the subset of the media feeds to the server, and the server transmits the selected subset of media feeds to the target UEs. Accordingly, a local director UE can direct the subset to the target UEs by controlling which media feeds are sent to the server, or a remote director UE can direct the subset to the target UEs by controlling which media feeds the server sends to the target UEs.

30 Claims, 14 Drawing Sheets

(56) References Cited

U.S. PATENT DOCUMENTS

| | | |
|---|---|---|
| 8,015,283 B2 | 9/2011 | Seidel |
| 8,082,303 B2 | 12/2011 | Laroia et al. |
| 8,352,585 B2 | 1/2013 | Hu et al. |
| 8,379,090 B1* | 2/2013 | Pearson et al. ............... 348/159 |
| 8,694,587 B2 | 4/2014 | Chaturvedi et al. |
| 2001/0010546 A1 | 8/2001 | Chen |
| 2001/0052006 A1 | 12/2001 | Barker et al. |
| 2003/0189589 A1 | 10/2003 | LeBlanc et al. |
| 2003/0210329 A1* | 11/2003 | Aagaard et al. ............. 348/159 |
| 2004/0032495 A1* | 2/2004 | Ortiz ............................ 348/157 |
| 2004/0116141 A1* | 6/2004 | Loven et al. ................. 455/519 |
| 2004/0125776 A1 | 7/2004 | Haugli et al. |
| 2004/0207724 A1 | 10/2004 | Crouch et al. |
| 2004/0230651 A1 | 11/2004 | Ivashin |
| 2005/0004916 A1 | 1/2005 | Miller et al. |
| 2005/0021744 A1 | 1/2005 | Haitsuka et al. |
| 2005/0160396 A1 | 7/2005 | Chadzynski |
| 2005/0198139 A1 | 9/2005 | Malkin et al. |
| 2006/0026628 A1 | 2/2006 | Wan et al. |
| 2006/0073843 A1 | 4/2006 | Aerrabotu et al. |
| 2006/0104347 A1 | 5/2006 | Callan et al. |
| 2006/0161671 A1 | 7/2006 | Ryman et al. |
| 2006/0174203 A1* | 8/2006 | Jung et al. ................... 715/751 |
| 2007/0018952 A1* | 1/2007 | Arseneau et al. ............ 345/156 |
| 2007/0106810 A1 | 5/2007 | Ryman et al. |
| 2007/0106811 A1 | 5/2007 | Ryman et al. |
| 2007/0162605 A1 | 7/2007 | Chalasani et al. |
| 2007/0279494 A1 | 12/2007 | Aman et al. |
| 2008/0013546 A1 | 1/2008 | Bhatt et al. |
| 2008/0013916 A1 | 1/2008 | Sharpe et al. |
| 2008/0051081 A1 | 2/2008 | Nelson |
| 2008/0080392 A1 | 4/2008 | Walsh et al. |
| 2008/0158366 A1 | 7/2008 | Jung et al. |
| 2009/0021576 A1 | 1/2009 | Linder et al. |
| 2009/0119406 A1 | 5/2009 | Zhu et al. |
| 2009/0132822 A1 | 5/2009 | Chen |
| 2009/0276522 A1 | 11/2009 | Seidel |
| 2010/0146092 A1 | 6/2010 | Hu et al. |
| 2010/0323669 A1 | 12/2010 | Maggenti et al. |
| 2010/0332220 A1 | 12/2010 | Hursey et al. |
| 2011/0055627 A1 | 3/2011 | Zawacki et al. |
| 2011/0161654 A1 | 6/2011 | Margolis et al. |
| 2011/0182225 A1 | 7/2011 | Song et al. |
| 2011/0183655 A1 | 7/2011 | Cao et al. |
| 2011/0235520 A1 | 9/2011 | Maciej et al. |
| 2012/0151046 A1 | 6/2012 | Weiss et al. |
| 2012/0151047 A1 | 6/2012 | Hodges et al. |
| 2012/0190403 A1* | 7/2012 | Myers et al. ............. 455/556.1 |
| 2013/0071085 A1 | 3/2013 | Ryman et al. |
| 2013/0111015 A1 | 5/2013 | Bauchot et al. |
| 2013/0232198 A1 | 9/2013 | Tenbrock |
| 2013/0300821 A1 | 11/2013 | Lankford et al. |
| 2013/0304865 A1 | 11/2013 | Dewing et al. |
| 2014/0181298 A1 | 6/2014 | Wang et al. |
| 2016/0028829 A1 | 1/2016 | Dewing et al. |

FOREIGN PATENT DOCUMENTS

| | | |
|---|---|---|
| EP | 1087618 A2 | 3/2001 |
| EP | 2239973 A1 | 10/2010 |
| GB | 2473059 A | 3/2011 |
| WO | 9917543 A1 | 4/1999 |

OTHER PUBLICATIONS

Jin.X., et al., "Detecting malicious nodes in peer-to-peer streaming by peer-based monitoring", ACM Trans. Multimedia Comput. Commun. Appl. 6, 2, Article 9 (Mar. 2010), 18 pages.

* cited by examiner

Sports Game Example

Circumventing State-Run TV Example

Sports Game Example

SELECTIVELY DIRECTING MEDIA FEEDS TO A SET OF TARGET USER EQUIPMENTS

BACKGROUND OF THE INVENTION

1. Field of the Invention

Embodiments relate to selectively directing media feeds to a set of target user equipments.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data, Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

Performance within wireless communication systems can be bottlenecked over a physical layer or air interface, and also over wired connections within backhaul portions of the systems.

SUMMARY

In an embodiment, a given UE joins a local group communication session between a group of UEs, establishes itself as a director, obtains media feeds captured by media capturing UEs in the group of UEs and transmits a selected subset of the media feeds to a server for transmission to target UEs. In another embodiment, the server receives the media feeds itself and sends the media feeds to a director UE. The director UE indicates a selection of the subset of the media feeds to the server, and the server transmits the selected subset of media feeds to the target UEs. Accordingly, a local director UE can direct the subset to the target UEs by controlling which media feeds are sent to the server, or a remote director UE can direct the subset to the target UEs by controlling which media feeds the server sends to the target UEs.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
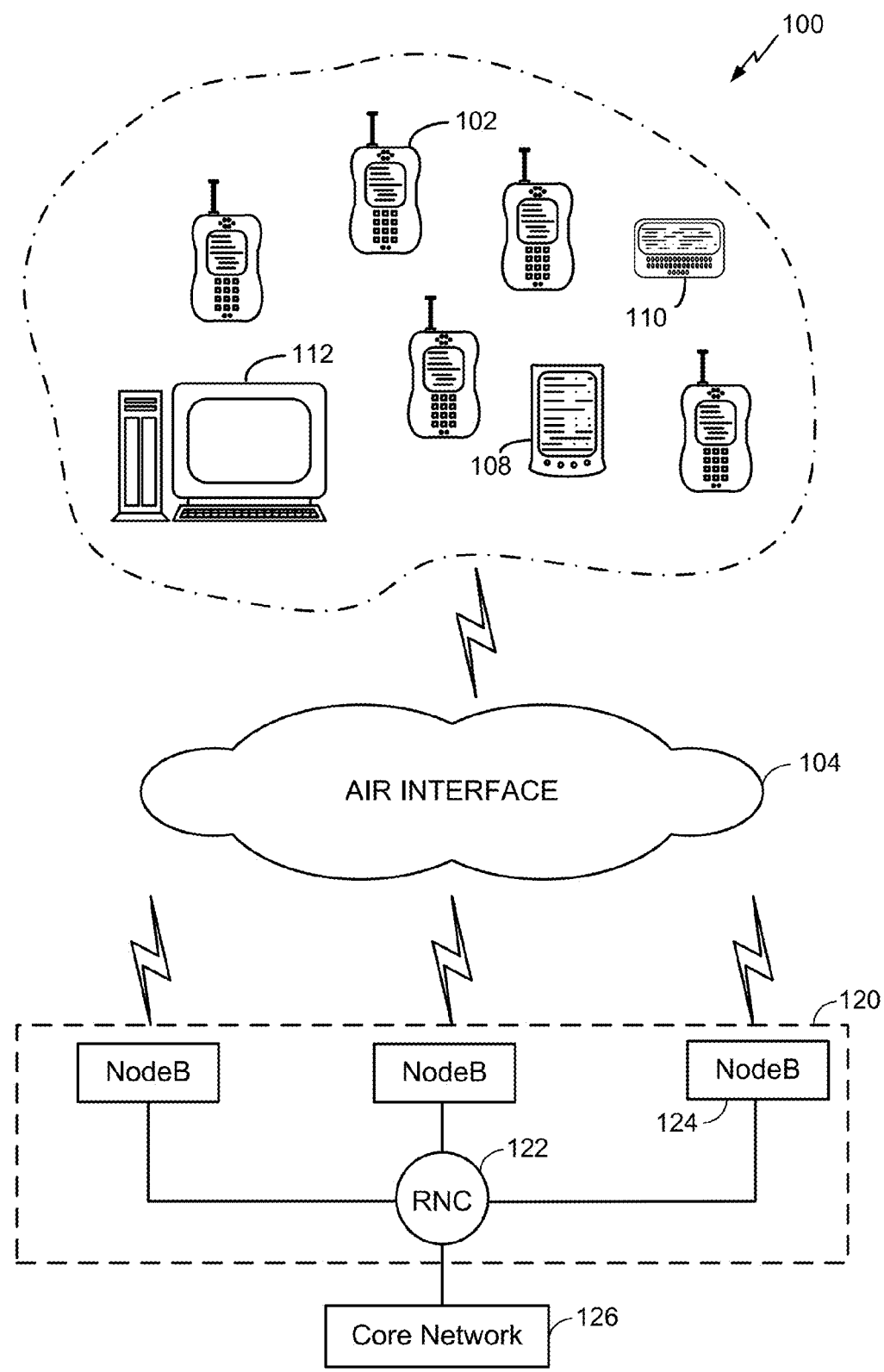
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.).

As used herein the term traffic channel (TCH) can refer to either an uplink/reverse or downlink/forward traffic channel.

As used herein the term subset of selected media feeds as related to multiple video feeds may correspond to combining or assembling the images or video in a manner to produce one or more video output feeds including at least portions of the selected media feeds.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant or tablet computer 108, a pager or laptop 110, which is shown here as a two-way text pager, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal," "AT," "wireless device," "client device," "mobile terminal," "mobile station" and variations thereof.

As used herein the term interlace, interlaced or interlacing as related to multiple video feeds correspond to stitching or assembling the images or video in a manner to produce a video output feed including at least portions of the multiple video feeds to form for example, a panoramic view, composite image, and the like.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2:
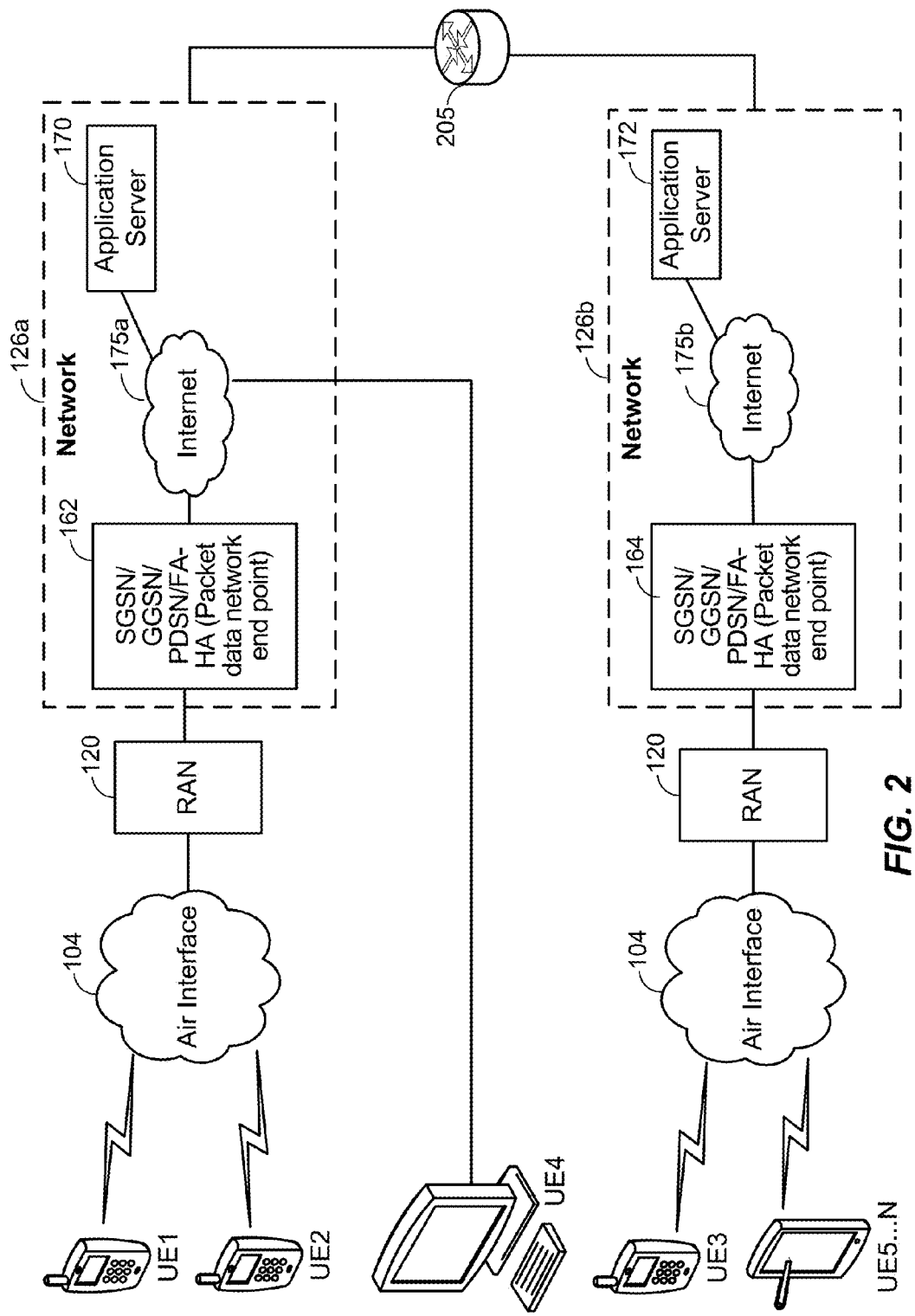
FIG. 2 illustrates a core network according to an embodiment of the present invention.

FIG. 2 illustrates an example of the wireless communications system 100 of FIG. 1 in more detail. In particular, referring to FIG. 2, UEs 1 . . . N are shown as connecting to the RAN 120 at locations serviced by different packet data network end-points. The illustration of FIG. 2 is specific to W-CDMA systems and terminology, although it will be appreciated how FIG. 2 could be modified to conform with various other wireless communications protocols (e.g., LTE, EV-DO, UMTS, etc.) and the various embodiments are not limited to the illustrated system or elements.

UEs 1 and 2 connect to the RAN 120 at a portion served by a portion of the core network denoted as 126a, including a first packet data network end-point 162 (e.g., which may correspond to SGSN, GGSN, PDSN, a home agent (HA), a foreign agent (FA), PGW/SGW in LTE, etc.). The first packet data network end-point 162 in turn connects to the Internet 175a, and through the Internet 175a, to a first application server 170 and a routing unit 205. UEs 3 and 5 . . . N connect to the RAN 120 at another portion of the core network denoted as 126b, including a second packet data network end-point 164 (e.g., which may correspond to SGSN, GGSN, PDSN, FA, HA, etc.). Similar to the first packet data network end-point 162, the second packet data network end-point 164 in turn connects to the Internet 175b, and through the Internet 175b, to a second application server 172 and the routing unit 205. The core networks 126a and 126b are coupled at least via the routing unit 205. UE 4 connects directly to the Internet 175 within the core network 126a (e.g., via a wired Ethernet connection, via a WiFi hotspot or 802.11b connection, etc., whereby WiFi access points or other Internet-bridging mechanisms can be considered as an alternative access network to the RAN 120), and through the Internet 175 can then connect to any of the system components described above.

Referring to FIG. 2, UEs 1, 2 and 3 are illustrated as wireless cell-phones, UE 4 is illustrated as a desktop computer and UEs 5 . . . N are illustrated as wireless tablets-and/or laptop PCs. However, in other embodiments, it will be appreciated that the wireless communication system 100 can connect to any type of UE, and the examples illustrated in FIG. 2 are not intended to limit the types of UEs that may be implemented within the system.

Figure 3A:
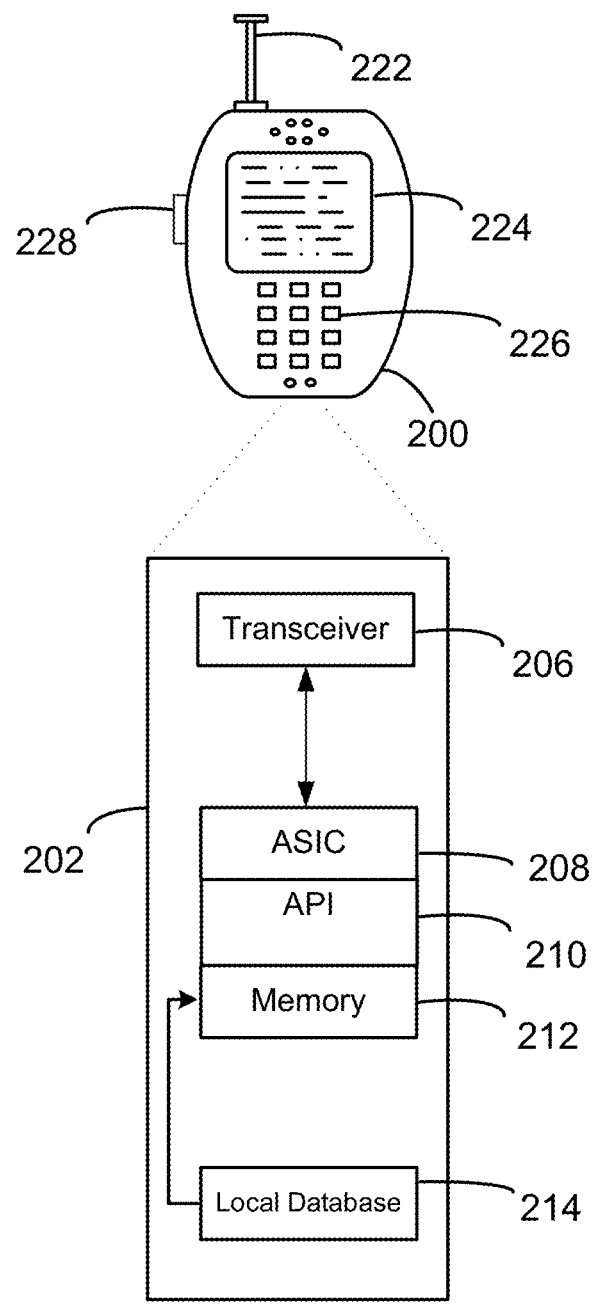
FIG. 3A is an illustration of a user equipment (UE) in accordance with at least one embodiment of the invention.

Referring to FIG. 3A, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3A are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), 3GPP Long Term Evolution (LTE) or other protocols that may be used in a wireless communications network or a data communications network. Accordingly, the illustrations provided herein are not intended to limit the embodiments of the invention and are merely to aid in the description of aspects of embodiments of the invention.

Figure 3B:
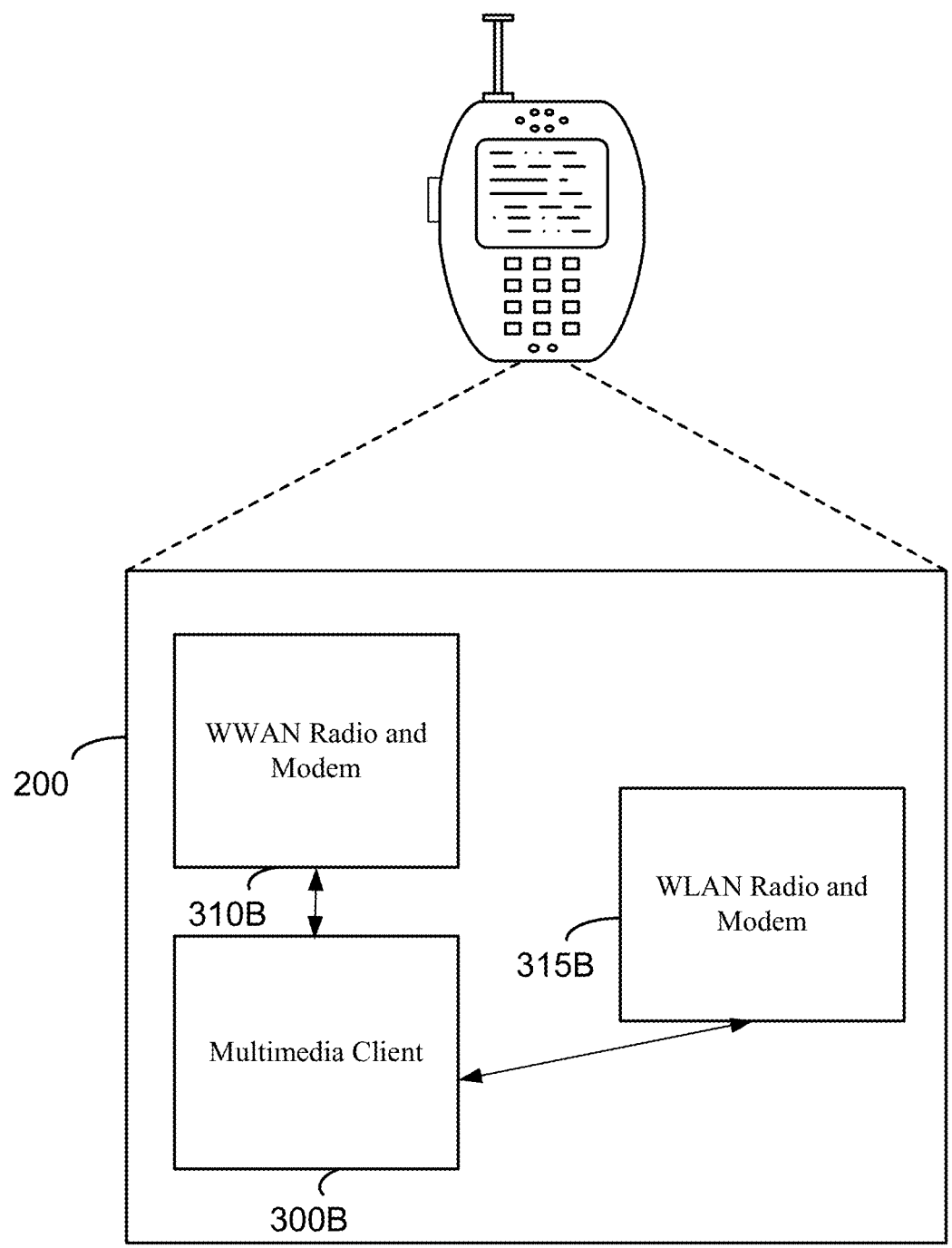
FIG. 3B illustrates software and/or hardware modules of the UE in accordance with another embodiment of the invention.

FIG. 3B illustrates software and/or hardware modules of the UE 200 in accordance with another embodiment of the invention. Referring to FIG. 3B, the UE 200 includes a multimedia client 300B, a Wireless Wide Area Network (WWAN) radio and modem 310B and a Wireless Local Area Network (WLAN) radio and modem 315B.

Referring to FIG. 3B, the multimedia client 300B corresponds to a client that executes on the UE 200 to support communication sessions (e.g., VoIP sessions, PTT sessions, PTX sessions, etc.) that are arbitrated by the application server 170 or 172 over the RAN 120, whereby the RAN 120 described above with respect to FIGS. 1 through 2 forms part of a WWAN. The multimedia client 300B is configured to support the communication sessions over a personal area network (PAN) and/or WLAN via the WLAN radio and modem 315B.

Referring to FIG. 3B, the WWAN radio and modem 310B corresponds to hardware of the UE 200 that is used to establish a wireless communication link with the RAN 120, such as a wireless base station or cellular tower. In an example, when the UE 200 can establish a good connection with the application server 170, the application server 170 can be relied upon to partially or fully arbitrate the UE 200's communication sessions such that the multimedia client 300B can interact with the WWAN radio modem 310B (to connect to the application server 170 via the RAN 120) to engage in the communication session.

The WLAN radio and modem 315B corresponds to hardware of the UE 200 that is used to establish a wireless communication link directly with other local UEs to form a PAN (e.g., via Bluetooth, WiFi, etc.), or alternatively connect to other local UEs via a local access point (AP) (e.g., a WLAN AP or router, a WiFi hotspot, etc.). In an example, when the UE 200 cannot establish an acceptable connection with the application server 170 (e.g., due to a poor physical-layer and/or backhaul connection), the application server 170 cannot be relied upon to fully arbitrate the UE 200's communication sessions. In this case, the multimedia client 300B can attempt to support a given communication session (at least partially) via a PAN using WLAN protocols (e.g., either in client-only or arbitration-mode).

Figure 4:
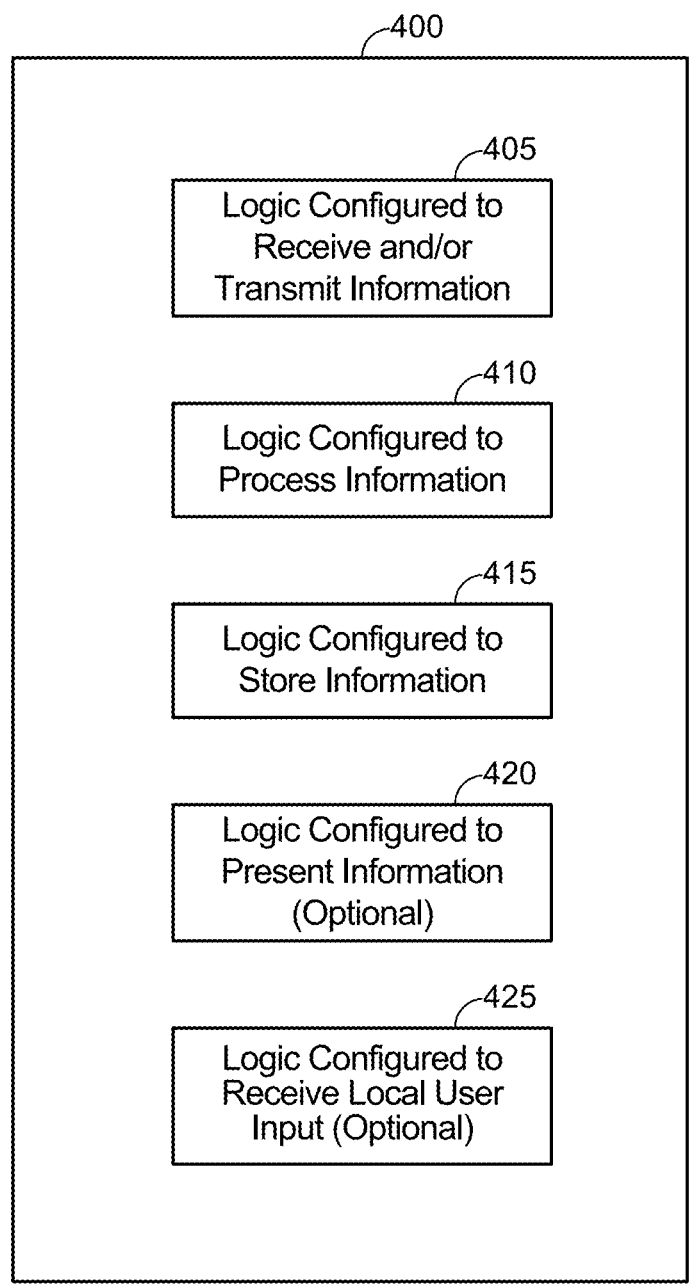
FIG. 4 illustrates a communication device that includes logic configured to perform functionality.

FIG. 4 illustrates a communication device 400 that includes logic configured to perform functionality. The communication device 400 can correspond to any of the above-noted communication devices, including but not limited to UEs 102, 108, 110, 112 or 200, Node Bs or base stations 120, the RNC or base station controller 122, a packet data network end-point (e.g., SGSN, GGSN, a Mobility Management Entity (MME) in Long Term Evolution (LTE), etc.), any of the servers 170 or 172, etc. Thus, communication device 400 can correspond to any electronic device that is configured to communicate with (or facilitate communication with) one or more other entities over a network.

Referring to FIG. 4, the communication device 400 includes logic configured to receive and/or transmit information 405. In an example, if the communication device 400 corresponds to a wireless communications device (e.g., UE 200, Node B 124, etc.), the logic configured to receive and/or transmit information 405 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175a or 175b can be accessed, etc.). Thus, if the communication device 400 corresponds to some type of network-based server (e.g., SGSN, GGSN, application servers 170 or 172, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 200 as shown in FIG. 3A, the logic configured to present information 420 can include the display 224. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 200 as shown in FIG. 3A, the logic configured to receive local user input 425 can include the display 224 (if implemented a touch-screen), keypad 226, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5A:
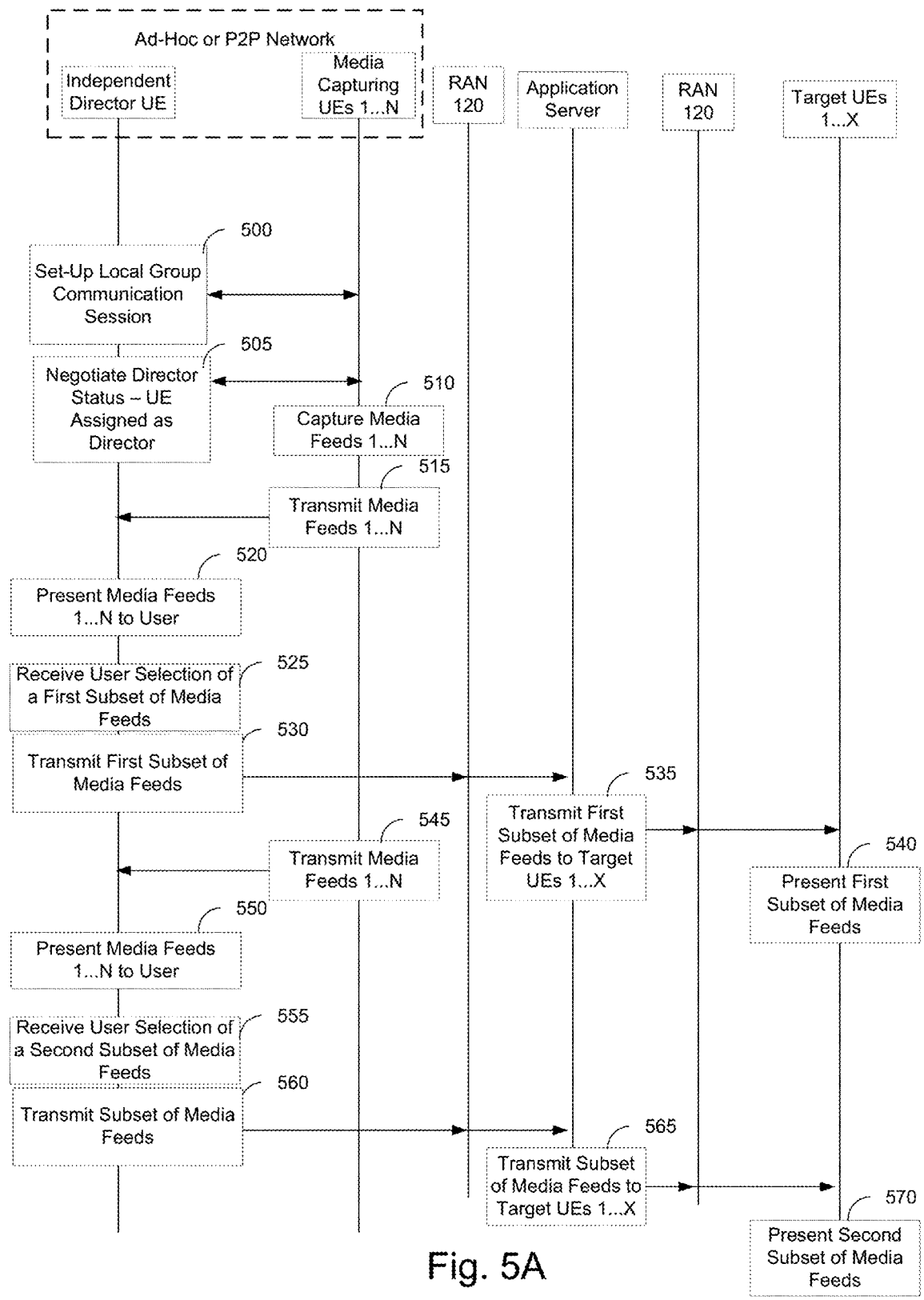
FIG. 5A illustrates a process of selectively directing a subset of a plurality of media feeds to a target set of UEs in accordance with an embodiment of the invention.

FIG. 5A illustrates a process of selectively directing a subset of a plurality of media feeds to a target set of UEs in accordance with an embodiment of the invention. Referring to FIG. 5A, an independent director UE (or broadcast station) has a connection (e.g., a 3G or 4G connection, a WiFI connection, etc.) via the RAN 120 to the application server 170, and the independent director UE establishes a local group communication session with a plurality of media capturing UEs 1 . . . N (e.g., whereby N≥2) by establishing a PAN (i.e., a peer-to-peer (P2P) network), 500. In FIG. 5, the independent director UE is "independent" in the sense that that independent director UE is not part of the group of media capturing UEs 1 . . . N that are responsible for capturing media, and instead primarily has a broadcast (or upload) responsibility on behalf of the media capturing UEs 1 . . . N. During the session set-up procedure of 500, the independent director UE negotiates with the media capturing UEs 1 . . . N to be designated the "director" of the local group communication session, 505. As used herein, the "director" is an initial target of media feeds containing the media captured by each of the media capturing UEs 1 . . . N during the local group communication session. The director is then relied upon to select and re-transmit selected media feed(s) to a set of target UEs 1 . . . X.

After the negotiation of 505 whereby the independent director UE is recognized as the director for the local group communication session, the media capturing UEs 1 . . . N begin (or continue) to capture media which is used to generate a plurality of media feeds 1 . . . N, 510. In an example, the media feeds 1 . . . N can include a video component and/or optionally an audio component as well. After the capturing operation of 510, each of the media capturing UEs 1 . . . N transmits its respective media feed to the independent director UE over the PAN, 515. In an example, the transmission of 515 can be a direct transmission from the media capturing UEs 1 . . . N to the independent director UE, or alternatively the transmission of one or more of the media feeds 1 . . . N can "hop" across one or more intermediate P2P nodes (e.g., other of the media capturing UE(s) or other UE(s) altogether) before reaching the independent director UE.

Referring to FIG. 5A, the independent director UE receives the media feeds 1 . . . N from the media capturing UEs 1 . . . N and then presents each of the respective media feeds 1 . . . N to its user, 520. For example, the presentation of 520 can correspond to a representation of each of the media feeds 1 . . . N as a relatively small video thumbnail in a display screen of the independent director UE. The independent director UE receives a user selection of a first subset of the media feeds 1 . . . N at 525. For example, the selection can correspond to the user left-clicking or tapping on a particular media feed. The first subset of selected media feeds can potentially include more than one of the media feeds 1 . . . N, but will generally include less than all of the media feeds 1 . . . N. The user will generally attempt to select the media feed(s) expected to be the most relevant to the target UEs 1 . . . X.

After the first subset of the media feeds 1 . . . N is selected at 525, the independent director UE transmits the first subset of media feeds to the application server 170, 530, the application server 170 transmits the first subset of media feeds to the target UEs 1 . . . X, 535, and the target UEs 1 . . . X present the first subset of media feeds on a set of media output devices (e.g., display devices) embedded within or coupled thereto, 540.

During the group communication session, the media capturing UEs 1 . . . N continue to transmit media feeds 1 . . . N to the independent director UE, 545, and the independent director UE continues to present each of the respective media feeds 1 . . . N to its user, 550 (e.g., similar to 515 and 520). At 555, assume that independent director UE receives a user selection of a second subset (different than the first subset) of the media feeds 1 . . . N. After the second subset of the media feeds 1 . . . N is selected at 555, the independent director UE transmits the second subset of media feeds to the application server 170, 560, the application server 170 transmits the second subset of media feeds to the target UEs 1 . . . X, 565, and the target UEs 1 . . . X present the second subset of media feeds on the set of media output devices (e.g., display devices) embedded within or coupled thereto, 570.

Figure 5B:
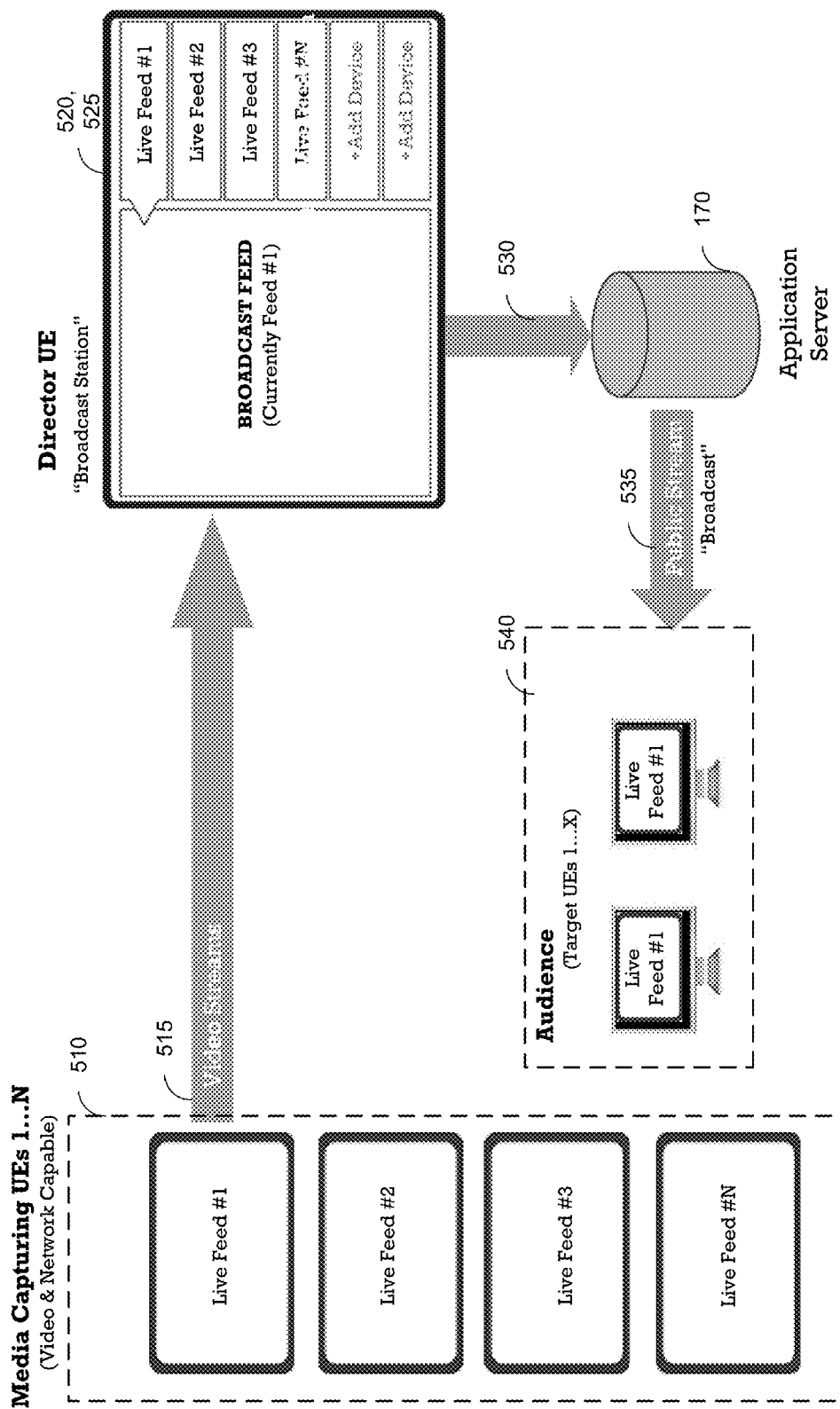
FIG. 5B illustrates an example implementation of the process of FIG. 5A with respect to a plurality of live video feeds 1 . . . N where N≥4 in accordance with an embodiment of the invention.

FIG. 5B illustrates an example implementation of the process of FIG. 5A with respect to a plurality of live video feeds 1 . . . N where N≥4 in accordance with an embodiment of the invention. Referring to FIG. 5B, assume that a local group communication session between the independent director UE and the media capturing UEs 1 . . . N has been established (500) and that the independent director UE is designated as the director for the local group communication session (505). With these assumptions in mind, the media capturing devices 1 . . . N capture live video feeds 1 . . . N at 510, the media capturing devices 1 . . . N transmit the live video feeds 1 . . . N to the independent director UE over the PAN or P2P network, 515, the independent director UE presents the live video feeds 1 . . . N and receives a user selection of live video feed 1, 520 and 525. As shown in the screenshot associated with 520 and 525 in FIG. 5B, the relatively small video thumbnails of the live video feeds 1 . . . N are shown in on the right-hand portion of the independent director UE's display screen as selectable options for the subset, and once a live video feed is selected, a larger broadcast feed section is configured to display the selected live video feed(s) on the left-hand portion of the display screen. In FIG. 5B, it is assumed that live video feed 1 is selected such that live video feed 1 occupies the broadcast feed section of the independent director UE's display screen. The independent director UE transmits live video feed 1 to the application server 170, 530, the application server 170 transmits live video feed 1 to the target UEs 1 . . . X, 535, and the target UEs 1 . . . X present live video feed 1, 540. 545 through 570 of FIG. 5A are not shown explicitly in FIG. 5B, but it will be readily appreciated that the independent director UE could select a different set of live video feeds at a later part of the local group communication session (e.g., the independent director UE could add live video feed 2 to live video feed 1 or could replace live video feed 1 with live video feed 2, etc.).

Figure 5C:
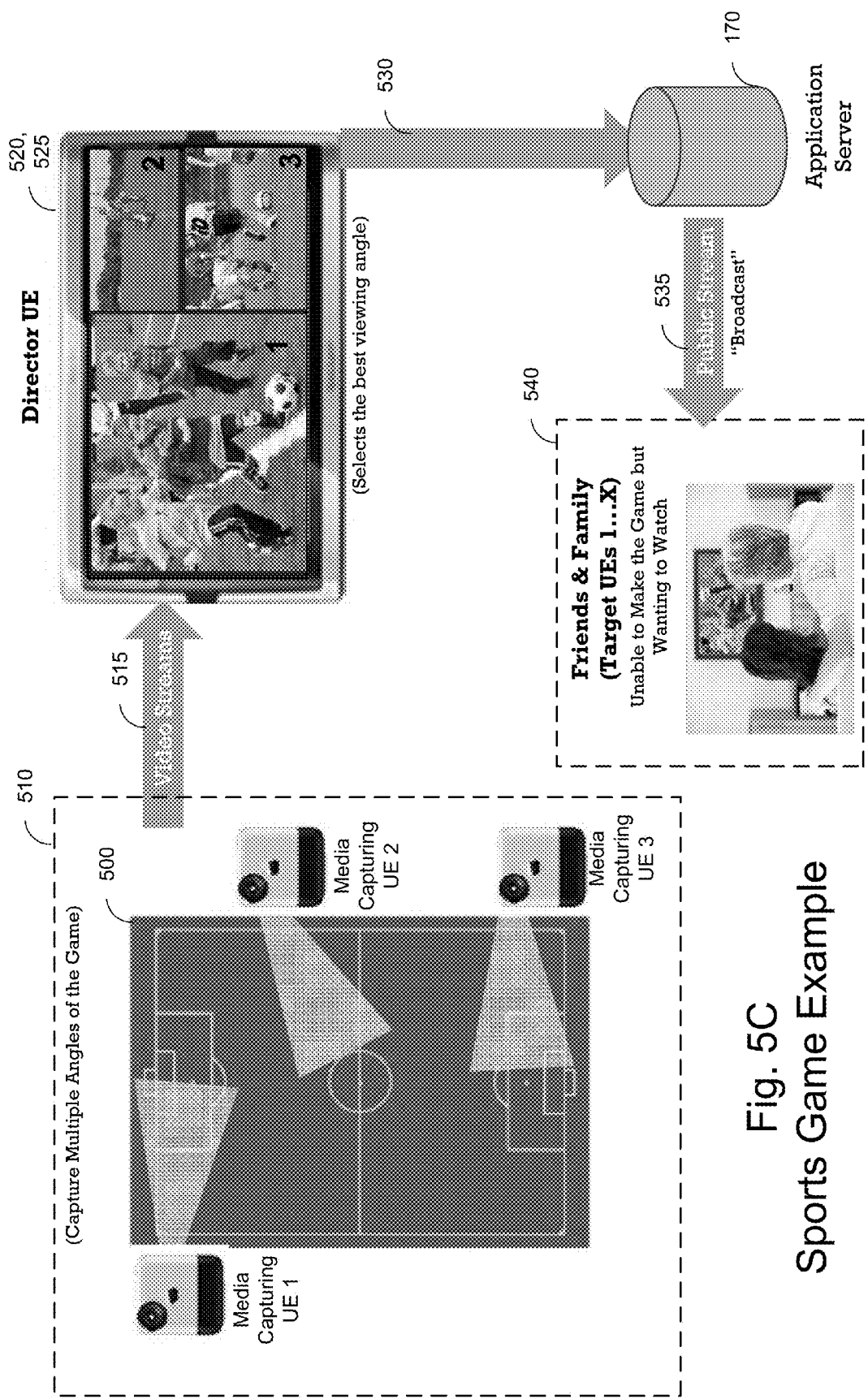
FIG. 5C illustrates an example implementation of the process of FIG. 5A with respect to a plurality of live video feeds 1 . . . N for a sports game where N=3 in accordance with an embodiment of the invention.

FIG. 5C illustrates an example implementation of the process of FIG. 5A with respect to a plurality of live video feeds 1 . . . N for a sports game where N=3 in accordance with an embodiment of the invention. FIG. 5C shows a more specific use-case example as compared to FIG. 5B. In FIG. 5C, assume that a local group communication session between the independent director UE and media capturing UEs 1 . . . 3 has been established (500) and that the independent director UE is designated as the director for the local group communication session (505). With these assumptions in mind, the media capturing devices 1 . . . 3 capture live video feeds 1 . . . 3 of a sports game from different vantage points or perspectives at 510, the media capturing devices 1 . . . 3 transmit the live video feeds 1 . . . 3 of the sports game to the independent director UE over the PAN or P2P network, 515, the independent director UE presents the live video feeds 1 . . . 3 of the sports game and receives a user selection of live video feed 1 from media capturing UE 1, 520 and 525.

In an example, with reference to FIG. 5C, the independent director UE may be broadcasting the sports game on behalf of a particular family or group of friends of a particular player playing the sports game. Thus, the independent director UE may attempt to select the live video feed showing that particular player in action, or alternatively the live video feed focusing on that particular player's team, or alternatively the live video feed that is captured from a bleacher section reserved for that particular player's team fans so that the cheers and boos of the crowd in an associated audio feed are synchronized with the expected favoritism of the users of the target UEs 1 . . . X. Alternatively, the independent director UE may assume general neutrality for the users of the target UEs 1 . . . X and may simply attempt to select the live video feed with the best angle depicting the action taking place in the game. For example, media capturing UEs 1 . . . 3 are each focusing on different parts of a sports field 500C for the sports game, and the independent director UE may attempt to switch between live video feeds as needed to "follow the ball" during the sports game.

As shown in the screenshot associated with 520 and 525 in FIG. 5C, the relatively small video thumbnails of the live video feeds 2 and 3 are shown in on the right-hand portion of the independent director UE's display screen as selectable options for the subset, and once live video feed 1 is selected, a larger broadcast feed section is configured to display the selected live video feed 1 on the left-hand portion of the display screen. Unlike FIG. 5B, the display screen at 520 and 525 of FIG. 5C does not duplicate the live video feed from the broadcast feed section within the selectable feed section on the right-hand side of the display screen. In FIG. 5C, it is assumed that live video feed 1 is selected such that live video feed 1 occupies the broadcast feed section of the independent director UE's display screen. The independent director UE transmits live video feed 1 to the application server 170, 530, the application server 170 transmits live video feed 1 to the target UEs 1 . . . X, 535, and the target UEs 1 . . . X present live video feed 1, 540. 545 through 570 of FIG. 5A are not shown explicitly in FIG. 5C, but it will be readily appreciated that the independent director UE could select a different set of live video feeds later during the sports game (e.g., the independent director UE could add live video feed 2 to live video feed 1 or could replace live video feed 1 with live video feed 2, etc.).

Figure 6:
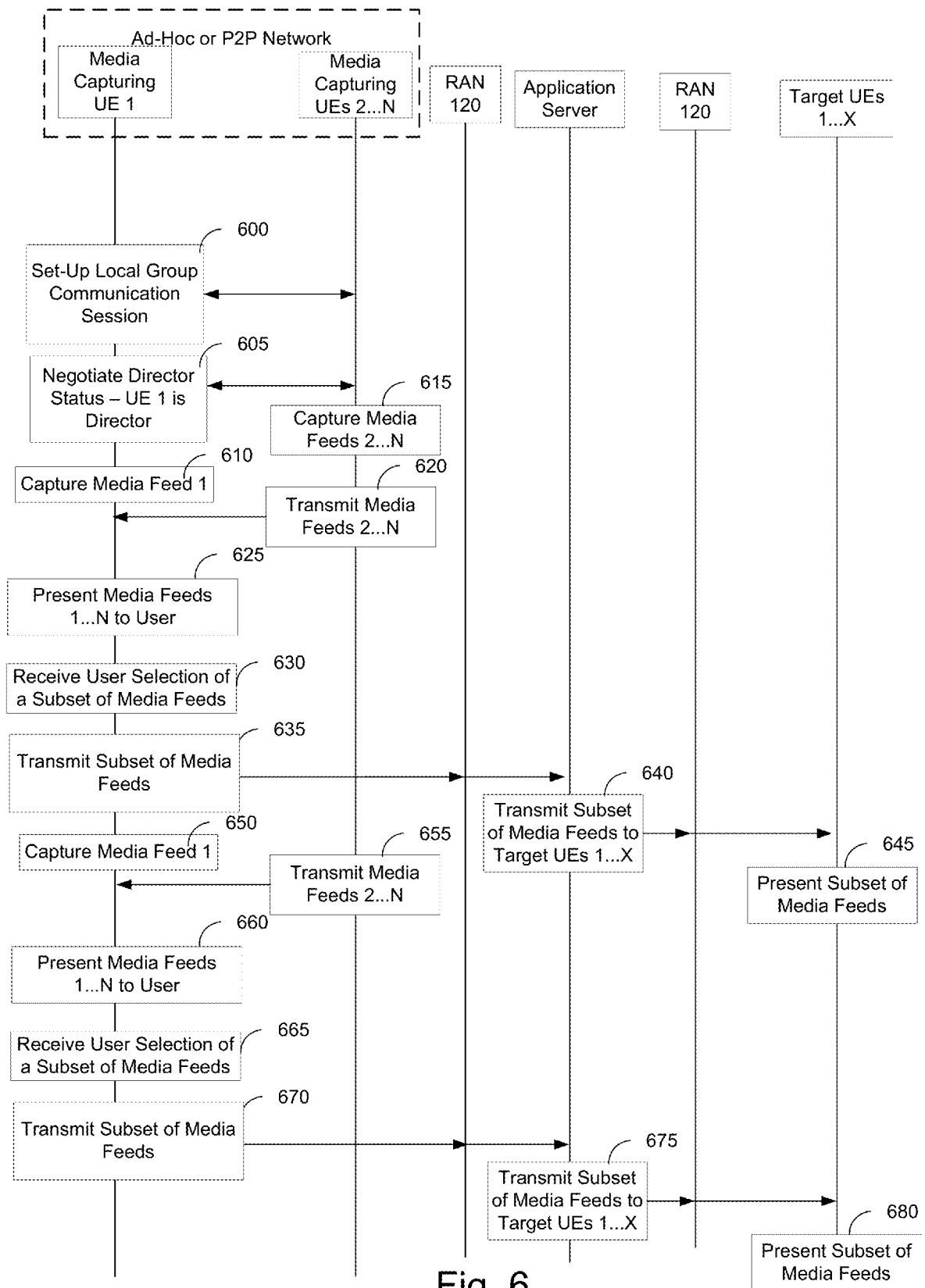
FIG. 6 illustrates a process of selectively directing a subset of a plurality of media feeds to a target set of UEs in accordance with another embodiment of the invention.

FIG. 6 illustrates a process of selectively directing a subset of a plurality of media feeds to a target set of UEs in accordance with another embodiment of the invention. In FIG. 5A, the independent director UE was a dedicated broadcast station that was not itself among the media capturing UEs 1 . . . N. By contrast, in FIG. 6, the director of the local group communication session corresponds to one of the media capturing UEs 1 . . . N.

Referring to FIG. 6, media capturing UEs 1 . . . N (e.g., whereby N≥2) establish a local group communication session with each other by establishing a PAN (i.e., a peer-to-peer (P2P) network), 600. During the session set-up procedure of 600, the media capturing UEs 1 . . . N negotiate with each other to designate a "director" of the local group communication session, 605. In the embodiment of FIG. 6, assume that the media capturing device 1 is designated as the director in 605. In an example, the negotiation of 605 may select the media capturing UE 1 as the director based on the media capturing UE 1 having a connection (e.g., a 3G or 4G connection, a WiFi connection, etc.) via the RAN 120 to the application server 170, or based on the media capturing UE 1 having the processing power to capture media, present media from multiple media feeds and transmit a selected subset of media feeds to the application server 170 at the same time, and so on.

After the negotiation of 605 whereby the media capturing UE 1 is recognized as the director for the local group communication session, the media capturing UEs 1 . . . N begin (or continue) to capture media which is used to generate a plurality of media feeds 1 . . . N, 610 and 615. After the capturing operation of 610 and 615, each of the media capturing UEs 2 . . . N transmits its respective media feed to the media capturing UE 1 over the PAN, 620. As will be appreciated, the media capturing UE 1 has local access to its own captured media feed and thereby does not need to transmit media feed 1 to itself. At this point, 625 through 645 substantially correspond to 520 through 540, respectively, of FIG. 5A, and as such will not be described further for the sake of convenience.

After 645 and during the group communication session, the media capturing UE 1 continues to capture media feed 1, 650, and the media capturing UEs 2 . . . N continue to capture and transmit media feeds 2 . . . N to the media capturing UE 1, 655. At this point, 660 through 680 substantially correspond to 550 through 570, respectively, of FIG. 5A, and as such will not be described further for the sake of convenience. Accordingly, aside from the director function being allocated to a media capturing UE instead of an independent director UE (or dedicated broadcast station), FIG. 6 operates similarly to FIG. 5A.

Figure 7:
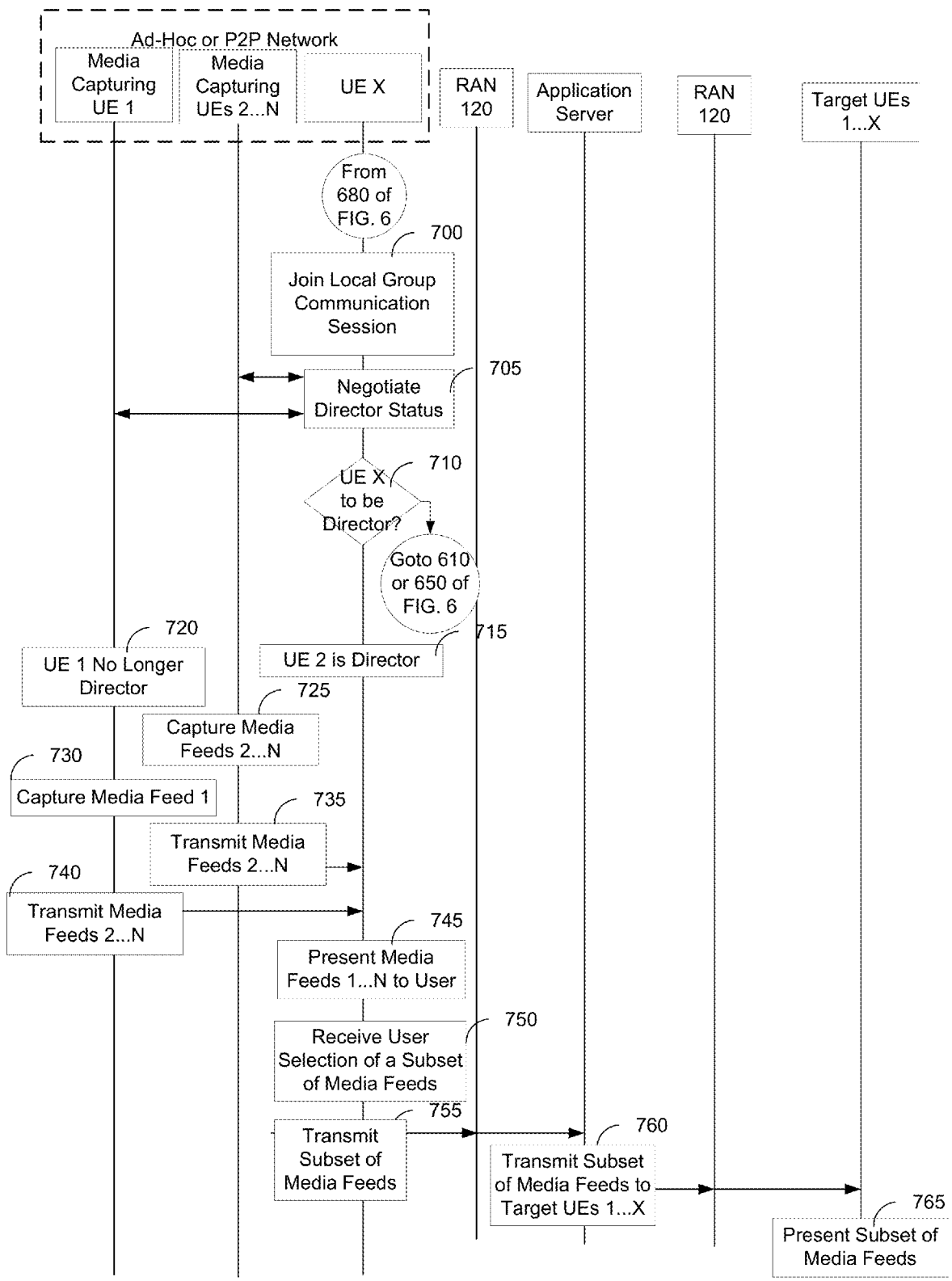
FIG. 7 illustrates a continuation of the process of FIG. 6 in accordance with an embodiment of the invention.

FIG. 7 illustrates a continuation of the process of FIG. 6 in accordance with an embodiment of the invention. Referring to FIG. 7, assume that UE X is a late joining UE to the local group communication session, 700. While UE X can be either an independent director UE as in FIG. 5 or another media capturing UE, UE X is described with respect to FIG. 7 as an independent director UE for the sake of convenience. Upon joining the local group communication session, the media capturing UEs 1 . . . N and UE X engage in another negotiation procedure to determine whether to switch the director from media capturing UE 1 to UE X, 705. For example, the relative network connections of media capturing UE 1 can be compared with UE X to make the director switch decision (e.g., so that the UE with the higher connection speed is designated as director), and so on. Generally, the director negotiation of 705 is similar to 605 of FIG. 6 except for being further based upon the available capabilities of UE X.

Based on the negotiation procedure of 705, UE X determines whether it is going to be the new director for the local group communication session at 710. If UE X determines that it is not going to be the new director for the local group communication session at 710, the process advances to 610 or 650 of FIG. 6 whereby media capturing UE 1 remains as director (although UE X could be added as a new media capturing UE among media capturing UEs 1 . . . N, if appropriate). Otherwise, if UE X determines that it is not going to be the new director for the local group communication session at 710, UE X transitions into director mode (i.e., UE X prepares to receive and present media feeds from media capturing UEs 1 . . . N for selective transmission to the application server 170), 715, and the media capturing UE 1 transitions out of director mode, 720. Accordingly, the media capturing UEs 1 . . . N continue to capture media feeds 1 . . . N, 725 and 730, the media capturing UEs 2 . . . N transmit their respective media feeds to UE X instead of the media capturing UE 1, 735, and the media capturing UE 1 transmits media feed 1 to UE X, 740. At this point, 745 through 765 substantially correspond to 625 through 645 or 660 through 680 of FIG. 6 except for being implemented in part at UE X instead of the media capturing UE 1.

While FIG. 7 describes a director transition to a late joining UE (i.e., UE X), it is also possible that the director function can be transferred to a UE that has already been participating in the local group communication session. For example, media capturing UE 1 may initially be designated as director based on a strong network connection, but this strong network connection may later deteriorate which can prompt another director negotiation resulting in a director transition. In another embodiment, media capturing UE 1 may initially be designated as director, but the media capturing UE 1 may later move out of range of the PAN so that the media capturing UE 1 can no longer receive the media feeds from the other media capturing UEs 2 . . . N. In this case, the media capturing UEs 2 . . . N could execute a new negotiation procedure to select a new director that remains in range of the group.

Further, FIGS. 5A through 7 are described above with respect to embodiments whereby a director UE and a group of media capturing UEs are each connected to the same local group connection (e.g., a PAN or P2P network). However, in other embodiments of the invention that are described below with respect to FIGS. 8A-8D, the director UE can be remote from the media capturing UEs, and the media capturing UEs can even be remote from each other.

Figure 8A:
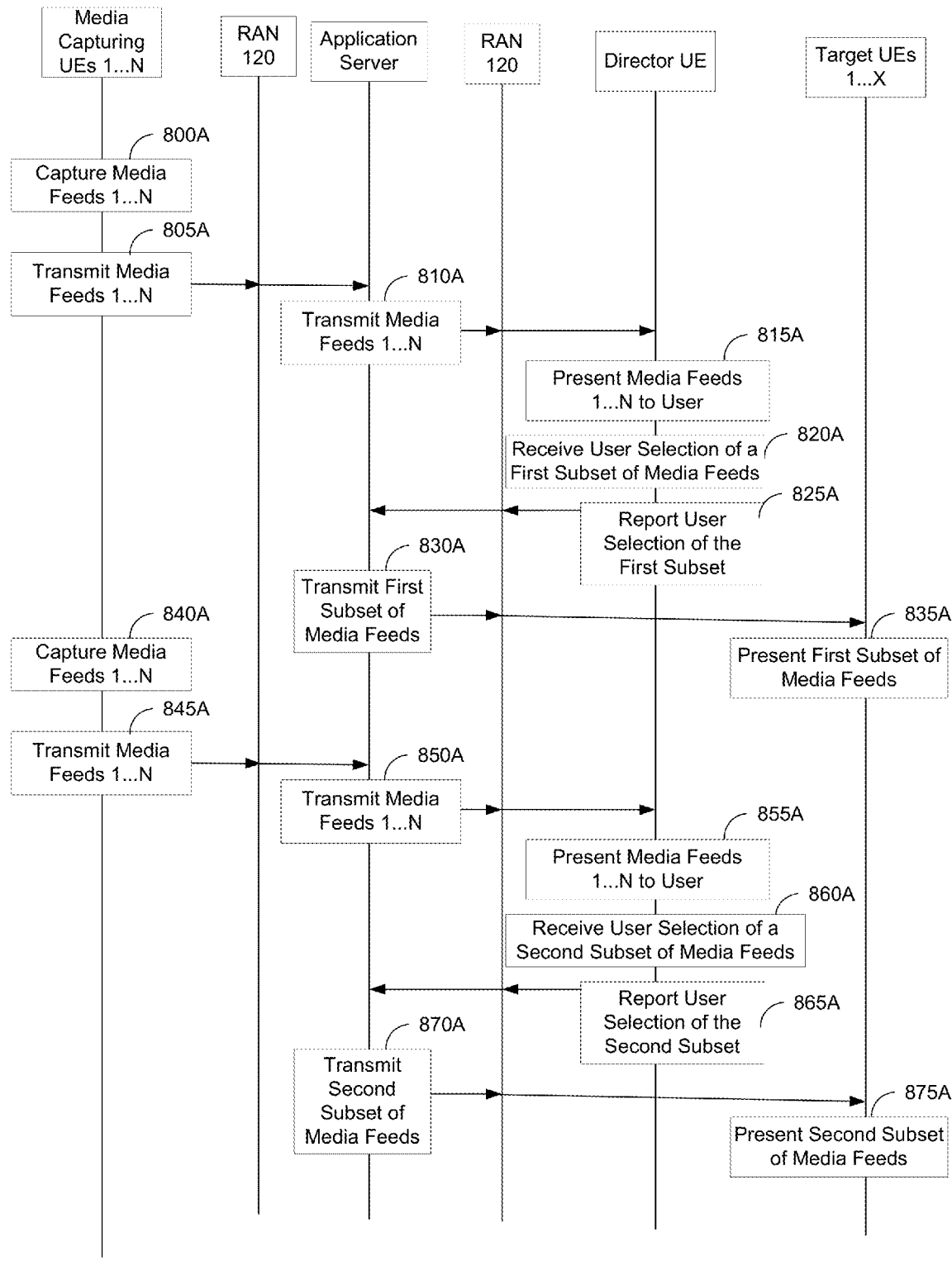
FIG. 8A illustrates another process of selectively directing a subset of a plurality of media feeds to a target set of UEs in accordance with an embodiment of the invention.

FIG. 8A illustrates another process of selectively directing a subset of a plurality of media feeds to a target set of UEs in accordance with an embodiment of the invention. In FIG. 8A, assume that an independent director UE (or broadcast station) is positioned remote from the media capturing UEs 1 . . . N, and can be reached by the media capturing UEs 1 . . . N through the application server 170 via the RAN 120 (e.g., a 3G or 4G connection, a WiFI connection, etc.) during a group communication session. Unlike FIG. 5A whereby the media capturing UEs 1 . . . N did not necessarily have the capacity to connect to the RAN 120 themselves and instead relied upon the independent director UE for the RAN-connection, one or more of the media capturing UEs 1 . . . N are configured to transmit their respective media feeds to the application server 170 via their own RAN-connection. In an example, each of the media capturing UEs 1 . . . N may have its own independent connection to the RAN 120, which is leveraged to carry the respective media feed. In another example, geographically close media capturing UEs may designate one UE to transmit on behalf of nearby media capturing UEs, although the designated UE simply relays the media feeds to the application server 170 and does not perform an actual directing function. Also, the media capturing UEs 1 . . . N can be notified of the independent director UE's identity and address in advance, or alternatively can be notified of the independent director UE's identity and address by the application server 170 in conjunction with setting up the group communication session. Accordingly, the media capturing UEs 1 . . . N need not perform the negotiation procedure from FIGS. 5A through 7 to converge on a director.

Referring to FIG. 8A, the media capturing UEs 1 . . . N begin (or continue) to capture media which is used to generate a plurality of media feeds 1 . . . N, 800A. In an example, the media feeds 1 . . . N can include a video component and/or optionally an audio component as well. After the capturing operation of 800A, each of the media capturing UEs 1 . . . N transmits its respective media feed to the application server 170 via the RAN 120, 805A. As noted above, certain groups of the media capturing UEs can designate a local UE for their media feed transmission (e.g., another P2P node with a higher upload capability or network connection), such that it is possible that fewer than N RAN-connections are leveraged for conveying the N media feeds to the application server 170. The application server 170 receives the media feeds 1 . . . N and transmits the media feeds 1 . . . N to the independent director UE, 810A.

Referring to FIG. 8A, the independent director UE receives the media feeds 1 . . . N from the application server 170 via the RAN 120 and then presents each of the respective media feeds 1 . . . N to its user, 815A. For example, the presentation of 815A can correspond to a representation of each of the media feeds 1 . . . N as a relatively small video thumbnail in a display screen of the independent director UE. The independent director UE receives a user selection of a first subset of the media feeds 1 . . . N at 820A. For example, the selection can correspond to the user left-clicking or tapping on a particular media feed. The first subset of selected media feeds can potentially include more than one of the media feeds 1 . . . N, but will generally include less than all of the media feeds 1 . . . N. The user will generally attempt to select the media feed(s) expected to be the most relevant to the target UEs 1 . . . X.

After the first subset of the media feeds 1 . . . N is selected at 820A, the independent director UE transmits an indication of the first subset of the media feeds 1 . . . N to the application server 170 via the RAN 120, 825A. The application server 170 receives the indication of the first subset from the independent director UE and then transmits the first subset of media feeds to the target UEs 1 . . . X based on the received indication, 830A, and the target UEs 1 . . . X present the first subset of media feeds on a set of media output devices (e.g., display devices) embedded within or coupled thereto, 835A.

During the group communication session, the media capturing UEs 1 . . . N continue to capture the media feeds 1 . . . N, 840A, the media capturing UEs 1 . . . N also continue to transmit media feeds 1 . . . N to the application server 170 via the RAN 120, 845A, and the application server 170 continues to transmit the media feeds 1 . . . N to the independent director UE, 850A. Likewise, the independent director UE continues to present each of the respective media feeds 1 . . . N to its user, 855A. At 860A, assume that independent director UE receives a user selection of a second subset (different than the first subset) of the media feeds 1 . . . N. After the second subset of the media feeds 1 . . . N is selected at 860A, the independent director UE transmits an indication of the second subset of the media feeds 1 . . . N to the application server 170 via the RAN 120, 865A. The application server 170 receives the indication of the second subset from the independent director UE and then transmits the second subset of media feeds to the target UEs 1 . . . X based on the indication, 870A, and the target UEs 1 . . . X present the second subset of media feeds on the set of media output devices (e.g., display devices) embedded within or coupled thereto, 875A.

Figure 8B:
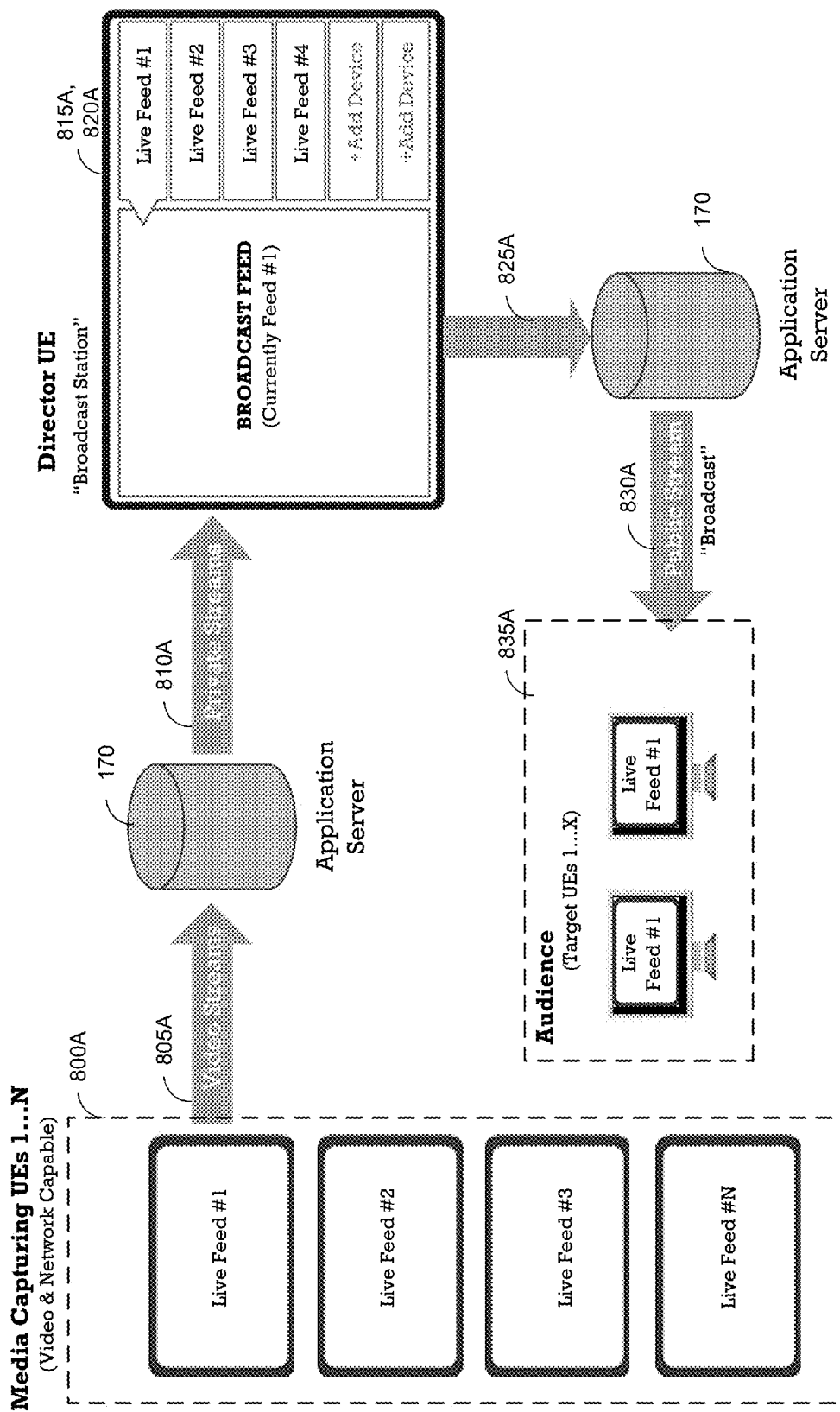
FIG. 8B illustrates an example implementation of the process of FIG. 8A with respect to a plurality of live video feeds 1 . . . N where N≥4 in accordance with an embodiment of the invention.

FIG. 8B illustrates an example implementation of the process of FIG. 8A with respect to a plurality of live video feeds 1 . . . N where N≥4 in accordance with an embodiment of the invention. Referring to FIG. 8B, the media capturing devices 1 . . . N capture live video feeds 1 . . . N at 800A, the media capturing devices 1 . . . N transmit the live video feeds 1 . . . N to the application server 170 via the RAN 120, 805A, and the application server 170 transmits the live video feeds 1 . . . N to the independent director UE via the RAN 120, 810A. The independent director UE presents the live video feeds 1 . . . N and receives a user selection of live video feed 1, 815A and 820A. As shown in the screenshot associated with 815A and 820A in FIG. 8B, the relatively small video thumbnails of the live video feeds 1 . . . N are shown in on the right-hand portion of the independent director UE's display screen as selectable options for the subset, and once a live video feed is selected, a larger broadcast feed section is configured to display the selected live video feed(s) on the left-hand portion of the display screen. In FIG. 8B, it is assumed that live video feed 1 is selected such that live video feed 1 occupies the broadcast feed section of the independent director UE's display screen. The independent director UE transmits an indication that the live video feed 1 has been selected to the application server 170, 825A, the application server 170 transmits the live video feed 1 to the target UEs 1 . . . X based on the selection indication, 830A, and the target UEs 1 . . . X present live video feed 1, 835A. 840A through 875A of FIG. 8A are not shown explicitly in FIG. 8B, but it will be readily appreciated that the independent director UE could select a different set of live video feeds at a later part of the local group communication session (e.g., the independent director UE could add live video feed 2 to live video feed 1 or could replace live video feed 1 with live video feed 2, etc.).

Figure 8C:
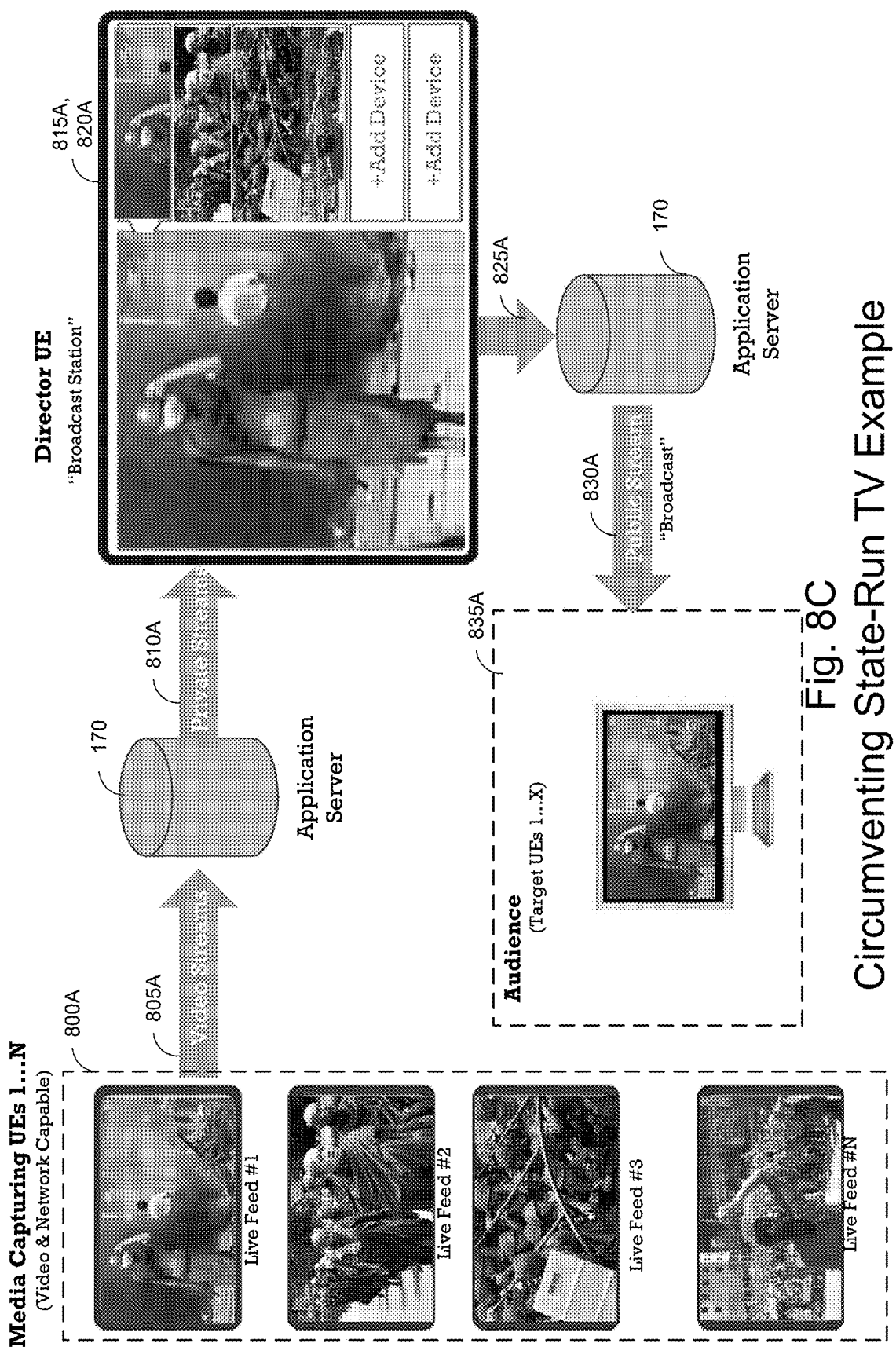
FIG. 8C illustrates a more detailed example implementation of the process of FIG. 8B in accordance with an embodiment of the invention.

FIG. 8C illustrates a more detailed example implementation of the process of FIG. 8B in accordance with an embodiment of the invention. In particular, the live video feeds 1 . . . N are each associated with a social uprising in a region where state-run television is predominant. In this case, the independent director UE may consolidate the live video feeds and select the subset for broadcasting to the target UEs 1 . . . X to improve that chances that the selected subset of live video feeds will be able to circumvent the state-run television censors. Accordingly, FIG. 8C is substantially the same as FIG. 8B except for being directed to a more specific use case, and will not be described further for the sake of brevity.

Figure 8D:
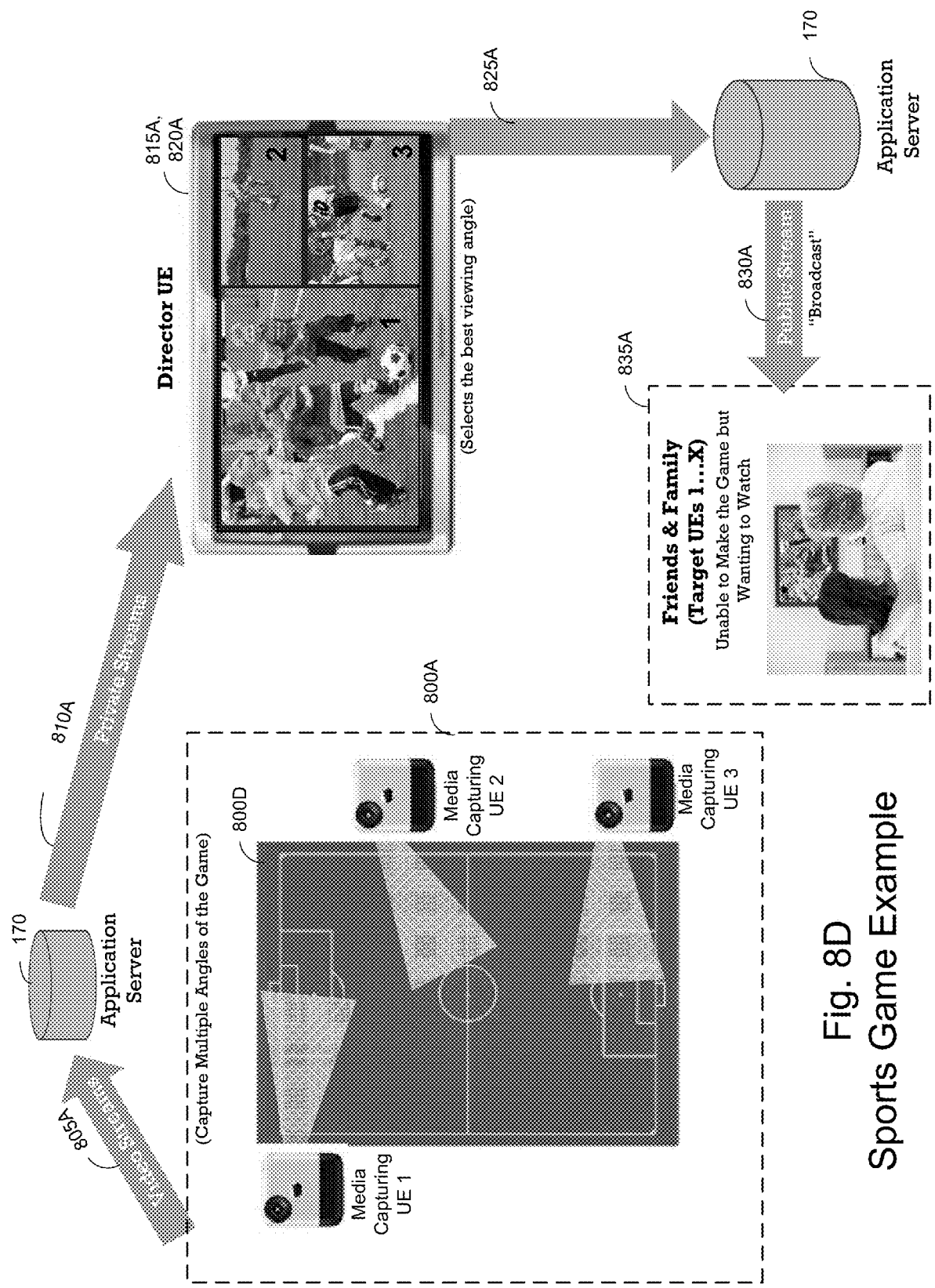
FIG. 8D illustrates an example implementation of the process of FIG. 8A with respect to a plurality of live video feeds 1 . . . N for a sports game where N=3 in accordance with an embodiment of the invention.

FIG. 8D illustrates an example implementation of the process of FIG. 8A with respect to a plurality of live video feeds 1 . . . N for a sports game where N=3 in accordance with an embodiment of the invention. FIG. 8D shows a more specific use-case example as compared to FIG. 8B. In FIG. 8D, the media capturing devices 1 . . . 3 capture live video feeds 1 . . . 3 of a sports game from different vantage points or perspectives at 800A, the media capturing devices 1 . . . 3 transmit the live video feeds 1 . . . 3 of the sports game to the application server 170 via the RAN 120, 805A, and the application server 170 transmits the live video feeds 1 . . . 3 to the independent director UE, 810A. The independent director UE presents the live video feeds 1 . . . 3 of the sports game and receives a user selection of live video feed 1 from media capturing UE 1, 815A and 820A.

In an example, with reference to FIG. 8D, the independent director UE may be broadcasting the sports game on behalf of a particular family or group of friends of a particular player playing the sports game. Thus, the independent director UE may attempt to select the live video feed showing that particular player in action, or alternatively the live video feed focusing on that particular player's team, or alternatively the live video feed that is captured from a bleacher section reserved for that particular player's team fans so that the cheers and boos of the crowd in an associated audio feed are synchronized with the expected favoritism of the users of the target UEs 1 . . . X. Alternatively, the independent director UE may assume general neutrality for the users of the target UEs 1 . . . X and may simply attempt to select the live video feed with the best angle depicting the action taking place in the game. For example, media capturing UEs 1 . . . 3 are each focusing on different parts of a sports field 800D for the sports game, and the independent director UE may attempt to switch between live video feeds as needed to "follow the ball" during the sports game.

As shown in the screenshot associated with 815A and 820A in FIG. 8B, the relatively small video thumbnails of the live video feeds 2 and 3 are shown in on the right-hand portion of the independent director UE's display screen as selectable options for the subset, and once live video feed 1 is selected, a larger broadcast feed section is configured to display the selected live video feed 1 on the left-hand portion of the display screen. Unlike FIG. 8B, the display screen at 815A and 820A of FIG. 8D does not duplicate the live video feed from the broadcast feed section within the selectable feed section on the right-hand side of the display screen. In FIG. 8D, it is assumed that live video feed 1 is selected such that live video feed 1 occupies the broadcast feed section of the independent director UE's display screen. The independent director UE transmits an indication that the live video 1 has been selected to the application server 170 via the RAN 120, 825A, and the application server 170 transmits live video feed 1 to the target UEs 1 . . . X, 830A, and the target UEs 1 . . . X present live video feed 1, 835A. 840A through 875A of FIG. 8A are not shown explicitly in FIG. 8C, but it will be readily appreciated that the independent director UE could select a different set of live video feeds at a later part of the local group communication session (e.g., the independent director UE could add live video feed 2 to live video feed 1 or could replace live video feed 1 with live video feed 2, etc.).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of transmitting media at a given user equipment (UE), comprising:
   joining a local group communication session over a personal area network (PAN) between a group of UEs;
   establishing the given UE as a director UE for the local group communication session;

obtaining, by the director UE, a plurality of media feeds captured by a plurality of media capturing UEs in the group of UEs;

presenting the plurality of media feeds on a user interface of the director UE;

obtaining, at the director UE, a selection from the user interface of the director UE of a first subset of media feeds for transmission in response to the presenting the plurality of media feeds on the user interface of the director UE, the first subset of media feeds including less than all of the plurality of media feeds captured during the local group communication session, the selection based on a relevancy of the first subset of media feeds for transmission including less than all of the plurality of media feeds to a set of target UEs separate from the director UE; and transmitting the selected first subset of media feeds including less than all of the plurality of media feeds, from the director UE, to a server for transmission to the set of target UEs.

2. The method of claim 1, wherein the given UE is both the director UE of the local group communication session and one of the plurality of media capturing UEs.

3. The method of claim 2, wherein the obtaining the plurality of media feeds includes:
receiving the plurality of media feeds from the plurality of media capturing UEs over the PAN.

4. The method of claim 1, wherein the given UE is the director UE of the local group communication session and is not one of the plurality of media capturing UEs.

5. The method of claim 4, wherein obtaining the plurality of media feeds includes:
locally capturing a given media feed among the plurality of media feeds at the given UE; and
receiving one or more remaining media feeds among the plurality of media feeds from one or more other of the plurality of media capturing UEs over the PAN.

6. The method of claim 1, wherein the establishing the given UE as a director UE for the local group communication session includes negotiating with the group of UEs to designate the given UE as the director UE based on a characteristic of the given UE.

7. The method of claim 1, further comprising:
obtaining a selection of a second subset of less than all of the plurality of media feeds during the local group communication session; and
transmitting the selected second subset of less than all of the plurality of media feeds to the server for transmission to the set of target UEs.

8. The method of claim 1, wherein the plurality of media feeds include a plurality of live video feeds captured at the plurality of media capturing UEs.

9. The method of claim 8, wherein one or more of the plurality of live video feeds are obtained in association with an audio feed.

10. The method of claim 1, further comprising:
determining another UE from the group of UEs to be established as the director UE when the given UE is established as the director UE for the local group communication session;
establishing the determined another UE from the group of UEs as the director UE for the local group communication session; and
transitioning the given UE to non-director status.

11. The method of claim 10, wherein the another UE is a late-joining UE that joins the local group communication session after the establishing the given UE as the director UE for the local group communication session.

12. The method of claim 10, further comprising:
transmitting a given media feed that is captured by the given UE to the another UE over the PAN after the another UE is established as the director UE.

13. A method of directing a group media session from a given user equipment (UE) configured as a director UE of the group media session, comprising:
receiving, from a server arbitrating the group media session, a plurality of media feeds that are captured by a plurality of media capturing UEs;
presenting the plurality of media feeds on a user interface of the director UE;
obtaining a selection from the user interface of the director UE of a first subset of media feeds for transmission in response to the presenting the plurality of media feeds on the user interface of the director UE, the first subset of media feeds including less than all of the plurality of media feeds, the selection based on a relevancy of the first subset of media feeds for transmission including less than all of the plurality of media feeds to a set of target UEs separate from the director UE; and
transmitting the selection of the first subset of media feeds including less than all of the plurality of media feeds from the director UE to the server to cause the server to transmit the selected first subset of media feeds including less than all of the plurality of media feeds to the set of target UEs.

14. The method of claim 13, wherein the director UE is not one of the plurality of media capturing UEs.

15. The method of claim 13, further comprising:
obtaining a selection of a second subset of less than all of the plurality of media feeds during the group media session; and
transmitting the selection of the second subset of less than all of the plurality of media feeds from the director UE to the server to cause the server to transmit the selected second subset of less than all of the plurality of media feeds to the set of target UEs.

16. The method of claim 13, wherein the plurality of media feeds include a plurality of live video feeds captured at the plurality of media capturing UEs.

17. The method of claim 16, wherein one or more of the plurality of live video feeds are obtained in association with an audio feed.

18. A method of arbitrating a group media session at a server, comprising:
receiving a plurality of media feeds that are captured by a plurality of media capturing user equipments (UEs) during the group media session;
transmitting the plurality of media feeds to a director UE for the group media session;
receiving, from the director UE, an indication of a selection made on the director UE of a first subset of media feeds for transmission, the first subset of media feeds including less than all of the plurality of media feeds, the selection based on a relevancy of the first subset of media feeds for transmission including less than all of the plurality of media feeds to a set of target UEs separate from the director UE; and
transmitting the selected first subset of media feeds including less than all of the plurality of media feeds to the set of target UEs in response to the received indication of the selection of the first subset of less than all of the plurality of media feeds.

19. The method of claim 18, further comprising:
receiving, from the director UE, a selection of a second subset of less than all of the plurality of media feeds; and
transmitting the selected second subset of less than all of the plurality of media feeds to the set of target UEs in response to the received selection of the second subset of less than all of the plurality of media feeds.

20. The method of claim 18, wherein the plurality of media feeds include a plurality of live video feeds captured at the plurality of media capturing UEs.

21. The method of claim 20, wherein one or more of the plurality of live video feeds are obtained in association with an audio feed.

22. A given user equipment (UE) configured to transmit media, comprising:
means for joining a local group communication session over a personal area network (PAN) between a group of UEs;
means for establishing the given UE as a director UE for the local group communication session;
means for obtaining, by the director UE, a plurality of media feeds captured by a plurality of media capturing UEs in the group of UEs;
means for presenting the plurality of media feeds on a user interface of the director UE;
means for obtaining, at the director UE, a selection from the user interface of the director UE of a first subset of media feeds for transmission in response to the presenting the plurality of media feeds on the user interface of the director UE, the first subset of media feeds including less than all of the plurality of media feeds captured during the local group communication session, the selection based on relevancy of the first subset of media feeds for transmission including less than all of the plurality of media feeds to a set of target UEs separate from the director UE; and
means for transmitting the selected first subset of media feeds including less than all of the plurality of media feeds from the director UE to a server for transmission to the set of target UEs.

23. A given user equipment (UE) configured as a director UE of a group media session, comprising:
means for receiving, from a server arbitrating the group media session, a plurality of media feeds that are captured by a plurality of media capturing UEs;
means for presenting the plurality of media feeds on a user interface of the director UE;
means for obtaining a selection from the user interface of the director UE of a first subset of media feeds for transmission in response to the presenting the plurality of media feeds on the user interface of the director UE, the first subset of media feeds including less than all of the plurality of media feeds, the selection based on relevancy of the first subset of media feeds for transmission including less than all of the plurality of media feeds to a set of target UEs separate from the director UE; and
means for transmitting the selection of the first subset of media feeds for transmission including less than all of the plurality of media feeds from the director UE to the server to cause the server to transmit the selected first subset of media feeds including less than all of the plurality of media feeds to the set of target UEs.

24. A server configured to arbitrate a group media session, comprising:
means for receiving a plurality of media feeds that are captured by a plurality of media capturing user equipments (UEs) during the group media session;
means for transmitting the plurality of media feeds to a director UE for the group media session;
means for receiving, from the director UE, an indication of a selection made on the director UE of a first subset of media feeds for transmission, the first subset of media feeds including less than all of the plurality of media feeds, the selection based on relevancy of the first subset of media feeds for transmission including less than all of the plurality of media feeds to a set of target UEs separate from the director UE; and
means for transmitting the selected first subset of media feeds including less than all of the plurality of media feeds to the set of target UEs in response to the received indication of the selection of the first subset of media feeds for transmission including less than all of the plurality of media feeds.

25. A given user equipment (UE) configured to transmit media, comprising:
a transceiver;
a memory; and
a processor coupled to the transceiver and the memory, the processor configured with processor executable instructions to perform operations comprising:
joining a local group communication session over a personal area network (PAN) between a group of UEs;
establishing the given UE as a director UE for the local group communication session;
obtaining, by the director UE, a plurality of media feeds captured by a plurality of media capturing UEs in the group of UEs;
presenting the plurality of media feeds on a user interface of the director UE;
obtaining, at the director UE, a selection from the user interface of the director UE of a first subset of media feeds for transmission in response to the presenting the plurality of media feeds on the user interface of the director UE, the first subset of media feeds including less than all of the plurality of media feeds during the local group communication session, the selection based on relevancy of the first subset of media feeds for transmission including less than all of the plurality of media feeds to a set of target UEs separate from the director UE; and
transmitting the selected first subset of media feeds including less than all of the plurality of media feeds from the director UE to a server for transmission to the set of target UEs.

26. A given user equipment (UE) configured as a director UE of a group media session, comprising:
a transceiver;
a memory; and
a processor coupled to the transceiver and the memory, the processor configured with processor executable instructions to perform operations comprising:
receiving, from a server arbitrating the group media session, a plurality of media feeds that are captured by a plurality of media capturing UEs;
presenting the plurality of media feeds on a user interface of the director UE;
obtaining a selection from the user interface of the director UE of a first subset of media feeds for transmission in response to the presenting the plurality of media feeds on the user interface of the director UE, the first subset of media feeds including less than all of the plurality of media feeds, the selection based on relevancy of the first subset of media feeds for transmission including less than all of the plurality of media feeds to a set of target UEs separate from the director UE; and transmitting the selection of the first subset of media feeds including less than all of the plurality of media feeds from the director UE to a server to cause the server to transmit the selected first subset of media feeds including less than all of the plurality of media feeds to the set of target UEs.

27. A server configured to arbitrate a group media session, comprising:
a transceiver;
a memory; and
a processor coupled to the transceiver and the memory, the processor configured with processor executable instructions to perform operations comprising:
receiving a plurality of media feeds that are captured by a plurality of media capturing user equipments (UEs) during the group media session;
transmitting the plurality of media feeds to a director UE for the group media session;
receiving, from the director UE, an indication of a selection made on the director UE of a first subset of media feeds for transmission, the first subset including less than all of the plurality of media feeds, the selection based on relevancy of the first subset of media feeds for transmission including less than all of the plurality of media feeds to a set of target UEs separate from the director UE; and
transmitting the selected first subset of media feeds including less than all of the plurality of media feeds to the set of target UEs in response to the received indication of the selection of the first subset of media feeds including less than all of the plurality of media feeds.

28. A non-transitory computer-readable medium containing processor-executable instructions stored thereon configured to cause a processor of a given user equipment (UE) to perform operations, comprising:
joining a local group communication session over a personal area network (PAN) between a group of UEs;
establishing the given UE as a director UE for the local group communication session;
obtaining, by the director UE, a plurality of media feeds captured by a plurality of media capturing UEs in the group of UEs;
presenting the plurality of media feeds on a user interface of the director UE;
obtaining, at the director UE, a selection from the user interface of the director UE of a first subset of media feeds for transmission in response to the presenting the plurality of media feeds on the user interface of the director UE, the first subset of media feeds including less than all of the plurality of media feeds captured during the local group communication session, the selection based on relevancy of the first subset of media feeds for transmission including less than all of the plurality of media feeds to a set of target UEs separate from the director UE; and transmitting the selected first subset of media feeds including less than all of the plurality of media feeds from the director UE to a server for transmission to the set of target UEs.

29. A non-transitory computer-readable medium containing processor-executable instructions stored thereon configured to cause a processor of a given user equipment (UE) configured as a director UE of a group media session to perform operations, comprising:
receiving, from a server arbitrating the group media session, a plurality of media feeds that are captured by a plurality of media capturing UEs;
presenting the plurality of media feeds on a user interface of the director UE;
obtaining a selection from the user interface of the director UE of a first subset of media feeds for transmission in response to the presenting the plurality of media feeds on the user interface of the director UE, the first subset of media feeds including less than all of the plurality of media feeds, the selection based on relevancy of the first subset of media feeds for transmission including less than all of the plurality of media feeds to a set of target UEs separate from the director UE; and
transmitting the selection of the first subset of media feeds including less than all of the plurality of media feeds from the director UE to the server to prompt the server to transmit the selected first subset of media feeds including less than all of the plurality of media feeds to the set of target UEs.

30. A non-transitory computer-readable medium containing processor-executable instructions stored thereon configured to cause a processor of a server configured to arbitrate a group media session, causes the server to perform operations, comprising:
receiving a plurality of media feeds that are captured by a plurality of media capturing user equipments (UEs) during the group media session;
transmitting the plurality of media feeds to a director UE for the group media session;
receiving, from the director UE, an indication of a selection made on the director UE of a first subset of media feeds for transmission, the first subset of media feeds including less than all of the plurality of media feeds, the selection based on relevancy of the first subset of media feeds for transmission including less than all of the plurality of media feeds to a set of target UEs separate from the director UE; and
transmitting the selected first subset of media feeds including less than all of the plurality of media feeds to the set of target UEs in response to the received indication of the selection of the first subset of media feeds including less than all of the plurality of media feeds.

* * * * *